United States Patent
Choi

(10) Patent No.: US 9,730,041 B2
(45) Date of Patent: Aug. 8, 2017

(54) EMERGENCY CALL SENDING SYSTEM AND METHOD THEREOF

(71) Applicant: Hyundai Motor Company, Seoul (KR)

(72) Inventor: Hyunwoo Choi, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 19 days.

(21) Appl. No.: 14/928,275

(22) Filed: Oct. 30, 2015

(65) Prior Publication Data

US 2016/0135028 A1 May 12, 2016

(30) Foreign Application Priority Data

Nov. 11, 2014 (KR) .................. 10-2014-0156444

(51) Int. Cl.
*H04W 4/22* (2009.01)
*H04W 24/08* (2009.01)
*H04L 29/08* (2006.01)

(52) U.S. Cl.
CPC ............ *H04W 4/22* (2013.01); *H04W 24/08* (2013.01); *H04L 67/12* (2013.01)

(58) Field of Classification Search
None
See application file for complete search history.

(56) References Cited

U.S. PATENT DOCUMENTS

| 2010/0164790 A1* | 7/2010 | Wisnewski | H01Q 1/3208 455/67.11 |
|---|---|---|---|
| 2012/0258705 A1* | 10/2012 | Wisnewski | H04W 4/046 455/423 |
| 2013/0325203 A1* | 12/2013 | Lu | G05B 23/0229 701/1 |

FOREIGN PATENT DOCUMENTS

| JP | 2003051779 | 2/2003 |
|---|---|---|
| JP | 5121430 | 1/2013 |
| KR | 10-1998-0076597 | 11/1998 |
| KR | 10-2005-0051780 | 6/2005 |
| KR | 20130029636 | 3/2013 |
| KR | 20140055818 | 5/2014 |
| KR | 20140059933 | 5/2014 |

\* cited by examiner

*Primary Examiner* — Daniel Lai
*Assistant Examiner* — Frank Donado
(74) *Attorney, Agent, or Firm* — Brinks Gilson & Lione

(57) ABSTRACT

An emergency call sending system includes a telematics unit including a determiner configured to determine whether a telematics antenna of a vehicle has a fault and a telematics terminal, and a user terminal connected to the telematics unit. An emergency call sending method includes determining whether a telematics antenna of a vehicle of an accident has a fault, and sending an emergency call to a telematics center through a user terminal connected to the telematics unit.

17 Claims, 3 Drawing Sheets

EMERGENCY CALL SENDING SYSTEM AND METHOD THEREOF

CROSS-REFERENCE TO RELATED APPLICATION

This application claims the benefit of priority to Korean Patent Application No. 10-2014-0156444, filed on Nov. 11, 2014, the disclosure of which is hereby incorporated by reference.

FIELD

The present disclosure relates to an emergency call sending system and a method thereof, and more particularly, to a technique for sending an emergency call for an emergency aid even when a telematics antenna installed at an outer portion of a vehicle is damaged.

BACKGROUND

The statements in this section merely provide background information related to the present disclosure and may not constitute prior art.

Recently, telematics techniques have become prevalent for safety, security, and infortainment of vehicles. Telematics enables a driver to remotely diagnose a vehicle through a wireless network, use various types of information such as traffic, living information, and emergency rescue, send a call message, exchange voice e-mails, and download audio-books.

Various telematics services such as news reception, stock investment, e-commerce, financial transactions, hotel booking, facsimile transmission and reception, games, vehicle accident and burglary may be provided according to service types. In particular, in a telematics service for safety, when a vehicle accident occurs, an emergency call is automatically sent to a telematics center or an emergency rescue center and a location of the vehicle of accident is automatically tracked and transmitted to the nearest 911 rescue center using GPS satellites, facilitating rescue work.

However, in the event of an accident, outer portions of a vehicle may be seriously damaged or some devices thereof may be detached. In particular, when external devices of the vehicle, relative to internal devices, are seriously damaged, an external antenna for using a telematics function may be damaged or detached, making it impossible to send an emergency call.

SUMMARY

The present disclosure has been made to address the above-mentioned problems occurring in the prior art while advantages achieved by the prior art are maintained intact.

An aspect of the present disclosure provides a technique of sending an emergency call using a user terminal connected to a telematics unit even when a telematics antenna of a vehicle has a fault.

According to an exemplary form of the present disclosure, an emergency call sending system includes, a telematics unit including a determiner configured to determine whether a telematics antenna of a vehicle has a fault and a telematics terminal, and a user terminal connected to the telematics unit.

The emergency call sending system may further include an impact sensor configured to transmit an accident occurrence signal of the vehicle to the telematics unit. The impact sensor may determine whether a vehicle accident has occurred by determining whether an air bag of the vehicle has been deployed.

The determiner may include a hardware determiner configured to determine whether the telematics antenna has a fault in hardware, and a software determiner configured to determine whether the telematics antenna has a fault in software.

The hardware determiner may determine whether the telematics antenna has a fault by checking removal of or damage to the telematics antenna. The software determiner may determine whether the telematics antenna has a fault by measuring a received signal strength indicator (RSSI) of the telematics antenna. Here, when the RSSI value of the telematics antenna is equal to or smaller than a predetermined reference for a specific period of time, the software determiner may determine that the telematics antenna has a fault.

The user terminal may be connected to the telematics unit by Bluetooth or a universal serial bus (USB), and the user terminal may send an emergency call to a telematics center or an emergency rescue center.

According to an exemplary form of the present disclosure, an emergency call sending method includes: determining whether a telematics antenna of a vehicle of an accident has a fault; and sending an emergency call to a telematics center through a user terminal connected to the telematics unit.

The method may further include: determining whether the vehicle accident has occurred by determining whether an air bag of the vehicle has been deployed.

The determining of whether the telematics antenna of the vehicle of the accident has a fault may include: a first operation of determining whether the telematics antenna has a fault in hardware, and the first operation may be determining whether the telematics antenna has been removed or damaged.

When the telematics antenna is determined to have a fault in the first operation, a second operation of determining whether the telematics antenna has a fault in software may be performed, and in the second operation, a received signal strength indicator (RSSI) of the telematics antenna may be measured and when the measured RSSI value is equal to or smaller than a predetermined reference for a specific period of time, it may be determined that there is a fault in connection of the telematics antenna.

The user terminal may be connected by Bluetooth or a USB, and the emergency call may be sent to a number of a telematics center stored in the telematics unit or to an emergency rescue center.

Further areas of applicability will become apparent from the description provided herein. It should be understood that the description and specific examples are intended for purposes of illustration only and are not intended to limit the scope of the present disclosure.

DRAWINGS

The above and other objects, features and advantages of the present disclosure will be more apparent from the following detailed description taken in conjunction with the accompanying drawings.

DETAILED DESCRIPTION

Hereinafter, exemplary forms of the present disclosure will be described in detail with reference to the accompanying drawings so that a person skilled in the art to which the present invention pertains may easily implement the invention.

Figure 1:
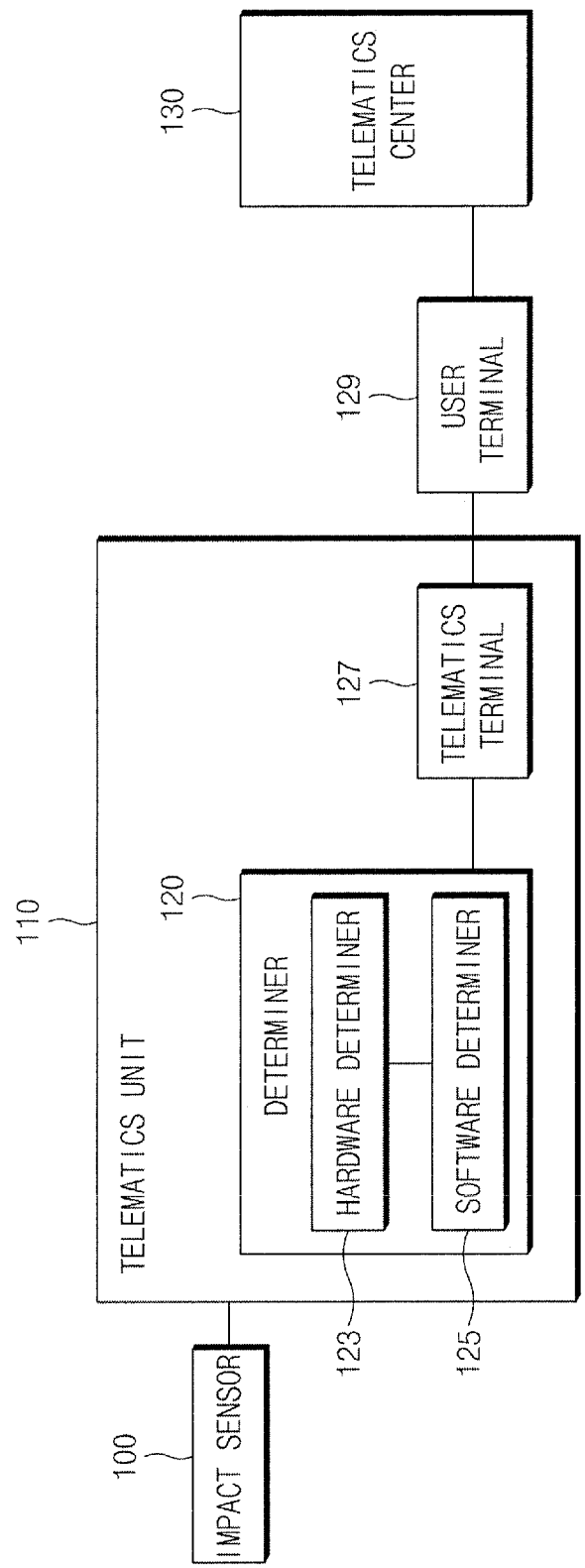
FIG. 1 is a block diagram illustrating an emergency call sending system.

FIG. 1 is a block diagram illustrating an emergency call sending system.

Referring to FIG. 1, the emergency call sending system includes an impact sensor 100, a telematics unit 110, and a user terminal 129.

The impact sensor 100 may sense an impact due to an accident of a vehicle and generate a corresponding impact detection signal. When an air bag installed in a driver's seat or a passenger seat of a vehicle is deployed, the impact sensor 100 recognizes a crash event and transmits a vehicle accident occurrence signal to the telematics unit 110.

The telematics unit 110 receives the vehicle accident occurrence signal from the impact sensor 100.

The telematics unit 110 includes a determiner 120 determining whether a telematics antenna providing an emergency call sending function has been removed or damaged, and a telematics terminal 127 sending an emergency call.

The determiner 120 includes a hardware determiner 123 physically checking a removal of or damage to the telematics antenna installed at an outer portion of a vehicle.

The determiner 120 further includes a software determiner 125 determining whether the telematics antenna has been damaged by checking received signal strength indicator (RSSI) of the telematics antenna.

When the determiner 120 determines that the telematics antenna is in good condition in hardware and software, the vehicle accident occurrence signal is transmitted to the telematics sensor 130 through the telematics terminal 127 to make an automatic emergency call.

Also, when the determiner 120 determines that the external vehicle antenna is abnormal in hardware or software, the determiner 120 transmits the accident occurrence signal of the vehicle to the user terminal 129 connected to the telematics unit 110 and an emergency call is automatically sent to the telematics center 130 through the user terminal 129. The user terminal 129 is connected to the telematics unit 110 through Bluetooth or a USB.

Here, the emergency call is sent to a phone number of the telematics center 130 stored in the telematics unit 110 or the user terminal 129, or a phone number of an emergency rescue center, for example, 119, 112, or 911.

As described above, even though the telematics antenna is damaged such that automatically sending an emergency call from the telematics terminal fails, the emergency call may be sent through the user terminal connected to the telematics unit.

Figure 2:
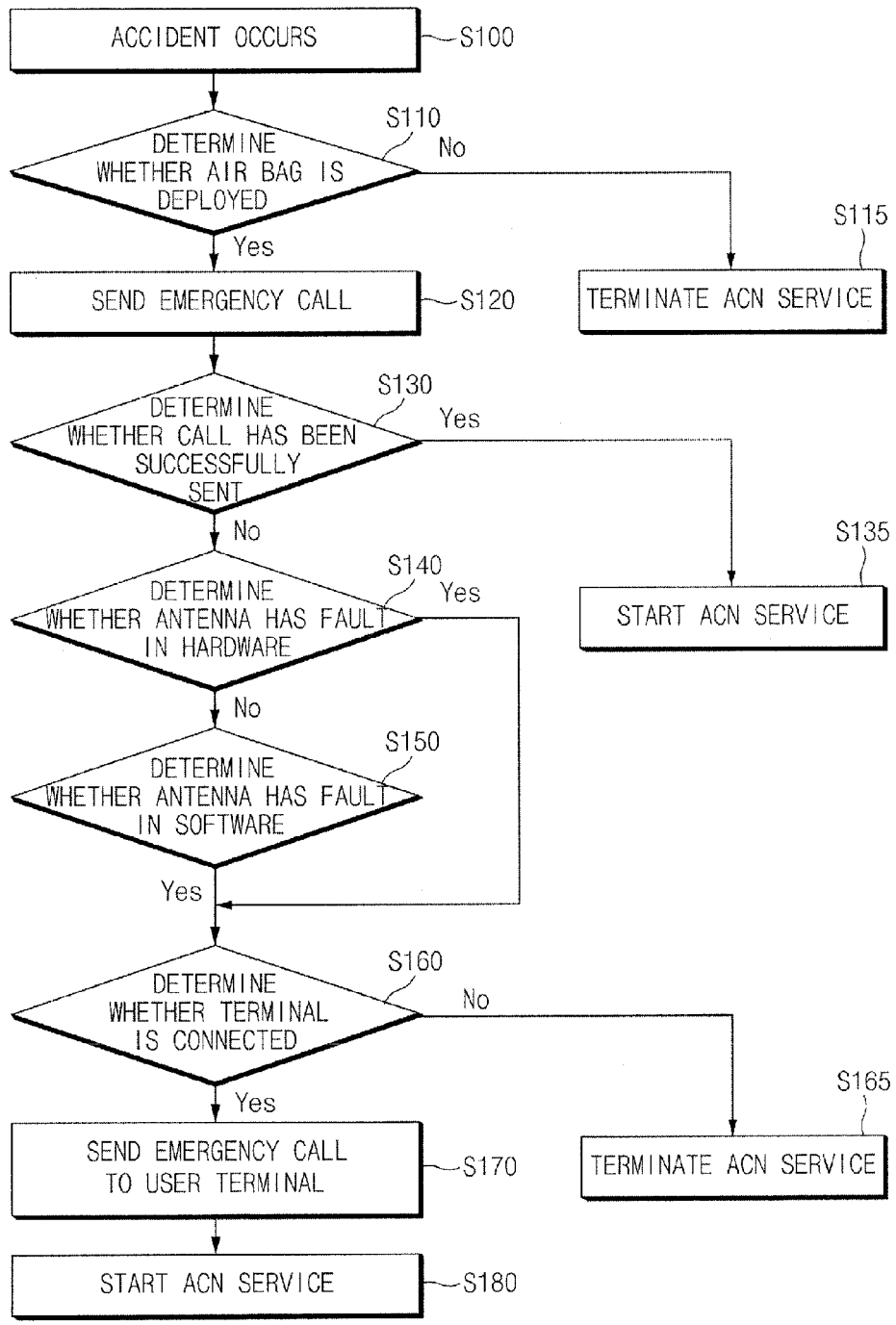
FIG. 2 is a flow chart illustrating an emergency call sending method.

FIG. 2 is a flow chart illustrating an emergency call sending method using an emergency call sending system.

An emergency call sending method will be described with reference to FIG. 2.

First, when a vehicle accident occurs in operation S100, it is determined whether an airbag at the driver's seat or the passenger seat has been deployed through the impact sensor (100 of FIG. 1) within the vehicle in operation S110. The impact sensor 100 senses an impact due to the vehicle accident and generates a corresponding impact sensing signal, and when the air bag installed at the driver's seat or the passenger seat of the vehicle is deployed, it is recognized that an accident occurs, and an accident occurrence signal of the vehicle is transmitted to the telematics unit 110.

In a case in which the air bag is not deployed, it is determined that a vehicle accident has not occurred, and an automatic collision notification (ACN) service is terminated in operation S115. The ACN service is a service that when an air bag is deployed in the event of a vehicle accident, the telematics unit (110 of FIG. 1) of the vehicle automatically sends an emergency call to the telematics center (130 of FIG. 1) to transmit vehicle and client information, vehicle location information, and accident signal information to automatically report an accident, and a dispatch request is made to 911 or an insurance company through a telematics counselor.

When it is determined that an air bag is deployed, it is recognized that a vehicle accident has occurred, and an accident occurrence signal of the vehicle is transmitted to the telematics unit 110 and an initial emergence call is sent to the telematics center 130 through the telematics terminal 127 of the telematics unit 110 in operation S120. Wireless data, instead of the emergency call, may also be sent.

Thereafter, it is determined whether the initial emergency call has been successfully transmitted in operation S130. When it is determined that the emergency call has been successfully delivered, an ACN service is started in operation S135.

If, however, the initial emergency call has not been successfully delivered, the hardware determiner (123 of FIG. 1) of the telematics unit 110 determines whether the telematics antenna installed on an outer portion of the vehicle has a fault in hardware in operation S140. Here, the hardware determiner 123 may determine whether the telematics antenna is properly connected by checking a removal of or damage to the telematics antenna.

When the hardware determiner 123 determines that the telematics antenna has a fault in hardware, operation S160 is performed.

If, however, the hardware determiner 123 does not determine that the telematics antenna has a fault, the software determiner (125 of FIG. 1) of the telematics unit 110 measures an RSSI of the telematics antenna and determines whether the telematics antenna has a fault in software in operation S150.

The method for determining whether the antenna has a fault using an RSSI of the telematics antenna will be described with reference to the graph of FIG. 3.

Figure 3:
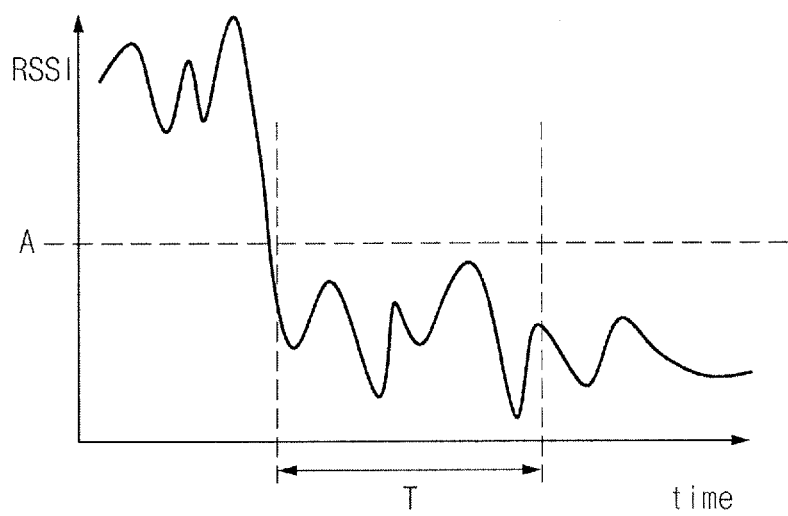
FIG. 3 is a graph illustrating received signal strength indicator (RSSI) for determining whether a telematics antenna is damaged in the emergency call sending system and method.

Referring to FIG. 3, in a case in which an RSSI value is equal to or smaller than a predetermined reference A during a specific period of time T, it may be determined that there is a fault in connection of the telematics antenna. Here, the reference value A generally represents a communication unavailable state value.

Next, when the RSSI is equal to or smaller than the predetermined reference A, it is determined that the telematics antenna has a fault in software. Thereafter, it is determined whether the user terminal (129 of FIG. 1), for example, a feature phone or a smartphone, is connected to the vehicle in operation S160. When it is determined that the user terminal 127 is not connected through Bluetooth or a USB, the ACN service is terminated in operation S165.

When it is determined that the user terminal 127 is connected through Bluetooth or a USB, an emergency call is sent through the user terminal 127 to allow the ACN service to be normally performed in operation S180. For example, a handsfree call may be sent through a feature phone connected by Bluetooth to perform an emergency call. Also, an emergency call may be performed through a smartphone connected by a USB.

The emergency call may be sent to a phone number of the telematics center 130 previously stored in the telematics unit 110 or the user terminal 127, or to a phone number of an emergency rescue center, for example, 119 or 911. Also, when it is impossible to obtain GPS information due to a fault of the telematics antenna, GPS information of the user terminal 127 may also be transmitted together. The user terminal 127 may periodically receive position information data obtained from GPS information in units of predetermined time so as to be updated.

As described above, according to exemplary forms of the present disclosure, in the event of a vehicle accident, even though there is a problem in sending an initial emergency call due to a fault of the telematics antenna installed at an outer portion of the vehicle, an emergency call for an emergency rescue may be sent through the user terminal connected to the telematics unit by Bluetooth or a USB.

Also, in the event of a vehicle accent, even when an outer portion of the vehicle is significantly damaged such that even the telematics antenna installed at an outer portion of the vehicle is damaged, an emergency call for an emergency rescue may be sent.

In addition, whether the telematics antenna is damaged may be determined through an RSSI, as well as by determining whether the telematics antenna is physically connected, and an emergency call may be sent through a user terminal connected to the telematics unit.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An emergency call sending system comprising:
   a telematics unit including a telematics terminal and a determiner configured to determine whether a telematics antenna of a vehicle has a fault; and
   a user terminal in communication with the telematics unit through the telematics terminal, wherein the user terminal is configured to send, to a telematics center, an emergency call including GPS information obtained by the user terminal when the telematics antenna is determined to have the fault and the telematics antenna is unable to obtain GPS information.

2. The emergency call sending system according to claim 1, further comprising:
   an impact sensor configured to transmit an accident occurrence signal of the vehicle to the telematics unit, and
   wherein the determiner is configured to determine the vehicle has a fault when the determiner receives the accident occurrence signal.

3. The emergency call sending system according to claim 2, wherein the impact sensor is configured to determine whether a vehicle accident has occurred by determining whether an air bag of the vehicle has been deployed.

4. The emergency call sending system according to claim 1, wherein the determiner includes:
   a hardware determiner configured to determine whether the telematics antenna has a fault in hardware; and
   a software determiner configured to determine whether the telematics antenna has a fault in software.

5. The emergency call sending system according to claim 4, wherein the hardware determiner is configured to determine the telematics antenna has a fault by checking for removal of or damage to the telematics antenna.

6. The emergency call sending system according to claim 4, wherein the software determiner is configured to determine the telematics antenna has a fault by measuring a received signal strength indicator (RSSI) of the telematics antenna.

7. The emergency call sending system according to claim 6, wherein when the RSSI value of the telematics antenna is equal to or smaller than a predetermined reference for a specific period of time, the software determiner is configured to determine that the telematics antenna has a fault.

8. The emergency call sending system according to claim 1, wherein the user terminal is connected to the telematics unit by Bluetooth or a universal serial bus (USB).

9. The emergency call sending system according to claim 1, wherein the user terminal is configured to send an emergency call to the telematics center or an emergency rescue center based on a command received from the telematics unit.

10. An emergency call sending method comprising:
    receiving, by a determiner of a telematics unit, an antenna condition status for a telematics antenna of a vehicle;
    determining, by the determiner of a telematics unit, whether the telematics antenna has a fault based on the antenna condition status; and
    controlling a user terminal in communication with the telematics unit to send an emergency call including GPS information obtained by the user terminal to a telematics center when the telematics antenna is determined to have a fault and the telematics antenna is unable to obtain GPS information.

11. The emergency call sending method according to claim 10, further comprising:
    determining whether a vehicle accident has occurred by determining whether an air bag of the vehicle has been deployed.

12. The emergency call sending method according to claim 10, wherein determining whether the telematics antenna has a fault includes:
    a first operation of determining of whether the telematics antenna has a fault in hardware.

13. The emergency call sending method according to claim 12, wherein the first operation is determining whether the telematics antenna has been removed or damaged.

14. The emergency call sending method according to claim 13, wherein when the telematics antenna is determined to have a fault in the first operation, a second operation of determining whether the telematics antenna has a fault in software is performed.

15. The emergency call sending method according to claim 14, wherein, in the second operation, a received signal strength indicator (RSSI) of the telematics antenna is measured and when the measured RSSI value is equal to or smaller than a predetermined reference for a specific period of time, it is determined that there is a fault in connection of the telematics antenna.

16. The emergency call sending method according to claim 10, wherein the user terminal is controlled to send the emergency call to the telematics center or to an emergency rescue center based on a command received from the telematics unit.

17. The emergency call sending method according to claim 10, wherein the user terminal is connected by Bluetooth or a universal serial bus (USB).

\* \* \* \* \*